United States Patent
Ikegami

(10) Patent No.: US 9,158,614 B2
(45) Date of Patent: Oct. 13, 2015

(54) SERVICE MANAGEMENT DEVICE, DISPLAY METHOD, AND INFORMATION STORAGE MEDIUM

(75) Inventor: Teruya Ikegami, Tokyo (JP)

(73) Assignee: NEC CORPORATION, Tokyo (*) Notice: Subject to any disclaimer, the term of this patent is extended or adjusted under 35 U.S.C. 154(b) by 218 days.

(21) Appl. No.: 13/823,794

(22) PCT Filed: Aug. 4, 2011

(86) PCT No.: PCT/JP2011/004432
§ 371 (c)(1),
(2), (4) Date: Mar. 15, 2013

(87) PCT Pub. No.: WO2012/053140
PCT Pub. Date: Apr. 26, 2012

(65) Prior Publication Data
US 2013/0179739 A1   Jul. 11, 2013

(30) Foreign Application Priority Data
Oct. 20, 2010 (JP) ................................ 2010-235302

(51) Int. Cl.
   *G06F 11/00* (2006.01)
   *G06F 11/07* (2006.01)
   (Continued)

(52) U.S. Cl.
   CPC ............ *G06F 11/0766* (2013.01); *G06Q 30/06* (2013.01); *H04L 41/064* (2013.01); *H04L 41/069* (2013.01); *H04L 41/147* (2013.01); *H04L 41/22* (2013.01); *H04L 43/067* (2013.01)

(58) Field of Classification Search
   CPC ............ G06F 11/0766; G06F 11/0784; G06F 11/0787; G06F 11/079; G06Q 30/06; H04L 41/064; H04L 41/069; H04L 41/147; H04L 41/22; H04L 43/067
   USPC ............................................... 714/57
   See application file for complete search history.

(56) References Cited

U.S. PATENT DOCUMENTS

| 6,141,777 A * | 10/2000 | Cutrell et al. ............... 714/47.3 |
| 2005/0246119 A1 * | 11/2005 | Koodali ........................ 702/79 |
| 2010/0214296 A1 * | 8/2010 | Kawamura .................... 345/440 |

FOREIGN PATENT DOCUMENTS

| EP | 2187567 A1 * | 5/2010 |
| JP | 2000-010620 | 1/2000 |

(Continued)

OTHER PUBLICATIONS

International Search Report PCT/JP2011/004432 dated Nov. 8, 2011, with English translation.

(Continued)

*Primary Examiner* — Bryce Bonzo
*Assistant Examiner* — Anthony J Amoroso
(74) *Attorney, Agent, or Firm* — Young & Thompson

(57) ABSTRACT

Disclosed is a unit for allowing a user, when any error occurs in a service, to easily ascertain the degree of influence on the service provision due to the error. In order to solve the above-described problem, there is provided a service management device including a graphing unit that graphically displays, on an identical time series graph, an access frequency to a predetermined service provided on a computer network and a predicted access frequency to the service in a state where no error occurs in the service, and displays an error occurrence time, on the time series graph, when the error occurs in the service.

16 Claims, 17 Drawing Sheets

(51) Int. Cl.
*H04L 12/24* (2006.01)
*G06Q 30/06* (2012.01)
*H04L 12/26* (2006.01)

(56) References Cited

FOREIGN PATENT DOCUMENTS

| | | |
|---|---|---|
| JP | 2004-198148 | 7/2004 |
| JP | 2005-094361 | 4/2005 |
| JP | 2008-086160 | 4/2008 |
| JP | 2009-289221 | 12/2009 |
| JP | 2010-086160 | 4/2010 |
| JP | 2010-128857 | 6/2010 |
| JP | 2010-190689 | 9/2010 |
| JP | 2010-191738 | 9/2010 |
| KR | 20090038982 A * | 4/2009 |

OTHER PUBLICATIONS

Toshio Tonouchi, "Fault Analysis under the Changeable Environment", IEICE Technical Report, Jul. 3, 2003 (Jul. 3, 2008), vol. 108, No. 123, pp. 55 to 60.

Japanese Office Action, dated Jun. 23, 2015, in corresponding Japanese Patent Application No. 2012-539570, with partial English translation.

* cited by examiner

| ACCESS INFORMATION ID | ACCESS TIME ZONE | ACCESS FREQUENCY | ATTRIBUTE INFORMATION | | | | | |
|---|---|---|---|---|---|---|---|---|
| | | | DATE | SEASON | WEA-THER | HIGHEST TEMPERA-TURE | LOWEST TEMPERA-TURE | .... |
| 20101001 | : | : | FRIDAY | AUTUMN | SUNNY | 24.2°C | 17.9°C | |
| | 10:00~10:01 | 15,003,271 | | | | | | |
| | 10:01~10:02 | 14,989,222 | | | | | | .... |
| | 10:02~10:03 | 15,121,384 | | | | | | |
| | : | : | | | | | | |
| 20101002 | 00:00~00:01 | 9,892,121 | SATUR-DAY | AUTUMN | RAINY | 19.8°C | 15.2°C | |
| | : | : | | | | | | .... |
| : | : | : | : | : | : | : | : | : |

| PREDICTED ACCESS FREQUENCY INFORMATION ID | TIME ZONE | PREDICTED ACCESS FREQUENCY | ATTRIBUTE INFORMATION | | | | | |
|---|---|---|---|---|---|---|---|---|
| | | | DATE | SEASON | WEATHER | HIGHEST TEMPERATURE | LOWEST TEMPERATURE | .... |
| 20091002 | 00:00~00:01 | 7,320,119 | FRIDAY | AUTUMN | SUNNY | 22.0°C | 19.0°C | |
| | 00:01~00:02 | 7,319,921 | | | | | | .... |
| | ⋮ | ⋮ | | | | | | |
| ⋮ | ⋮ | ⋮ | ⋮ | ⋮ | ⋮ | ⋮ | ⋮ | .... |

| ACCESS INFORMATION ID | ERROR OCCURRENCE TIME |
|---|---|
| 20101001 | 09:44:03 |
| ⋮ | ⋮ |

FIG. 17

| PAST ACCESS FREQUENCY INFORMATION ID | ACCESS TIME ZONE | ACCESS FREQUENCY | ATTRIBUTE INFORMATION | | | | | |
|---|---|---|---|---|---|---|---|---|
| | | | DATE | SEASON | WEATHER | HIGHEST TEMPERATURE | LOWEST TEMPERATURE | |
| 20091002 | 00:00~00:01 | 7,320,119 | FRIDAY | AUTUMN | SUNNY | 22.0°C | 19.0°C | |
| | 00:01~00:02 | 7,819,921 | | | | | | .... |
| | ⋮ | ⋮ | | | | | | |
| ⋮ | ⋮ | ⋮ | ⋮ | ⋮ | ⋮ | ⋮ | ⋮ | .... |

17a

SERVICE MANAGEMENT DEVICE, DISPLAY METHOD, AND INFORMATION STORAGE MEDIUM

TECHNICAL FIELD

The present invention relates to a service management device, a display method, and a program.

BACKGROUND ART

For example, Patent Document 1 discloses a plant operation apparatus that operates a plant such as water and sewage equipment. The plant operation apparatus displays current value data and past record data to be superimposed with each other on a trend graph in which a vertical axis represents a flow rate and a horizontal axis represents time.

Patent Document 1 discloses that, according to the plant operation apparatus, it is possible to compare a tendency of a current plant operation and a tendency of a past plant operation and to detect an abnormal tendency, in particular, to clearly ascertain abnormalities that occur in an unexpected fashion.

RELATED DOCUMENT

Patent Document

[Patent Document 1] Japanese Unexamined Patent Publication No. 2000-10620

DISCLOSURE OF THE INVENTION

There is a system that provides a predetermined service to a user who has accessed via a computer network. For example, there is a system that provides a user who has accessed to the system with a Web screen including predetermined information via a terminal device and with a service that receives applications for product purchasing from the Web screen.

There is a demand for a unit, when any error occurs in a service provided by the system, that allows a user such as a system manager to easily ascertain the degree of influence on the service provision due to the error.

Therefore, the present inventor has considered a unit for ascertaining the degree of influence on the service provision due to the error using changes in access frequency of a terminal device to the service. However, the factors of changes in access frequency include other factors as well as a service error. Accordingly, only with information indicating the changes in the access frequency, a user cannot ascertain which factors cause the changes. In other words, the user cannot easily ascertain the degree of influence on the service provision due to the error only with the information.

Therefore, an object of the present invention is to provide a unit for allowing a user, when any error occurs in a predetermined service provided on a computer network, to easily ascertain the degree of influence on the service provision due to the error.

According to the present invention, there is provided a service management device including a graphing unit that graphically displays, on an identical time series graph, an access frequency to a predetermined service provided on a computer network and a predicted access frequency to the service in a state where no error occurs in the service, and displays an error occurrence time, on the time series graph, when the error occurs in the service.

According to the present invention, there is also provided a display method including: graphically displaying, on an identical time series graph, an access frequency to a predetermined service provided on a computer network and a predicted access frequency to the service in a state where no error occurs in the service; and displaying an error occurrence time, on the time series graph, when the error occurs in the service.

According to the present invention, there is also provided a program for causing a computer to function as a graphing unit, wherein the graphing unit graphically displays, on an identical time series graph, an access frequency to a predetermined service provided on a computer network and a predicted access frequency to the service in a state where no error occurs in the service, and displays an error occurrence time, on the time series graph, when the error occurs in the service.

According to the present invention, when any error occurs in a predetermined service provided on a computer network, a user may easily ascertain the degree of influence on the service provision due to the error.

BRIEF DESCRIPTION OF THE DRAWINGS

The above-described objects, other objects, features and advantages will be further apparent from the preferred embodiments described below, and the accompanying drawings as follows.

FIG. 2 shows a diagram for describing a configuration of an access information acquisition unit and an access information holding unit of an embodiment of the present invention.

FIG. 3 is a diagram for describing a configuration of a predicted access frequency information holding unit of an embodiment of the present invention.

FIG. 5 is a diagram for describing a configuration of an error occurrence time acquisition unit of an embodiment of the present invention.

FIG. 17 is a diagram for describing a configuration of a past record information holding unit of the embodiment of the present invention.

DESCRIPTION OF EMBODIMENTS

Hereinafter, embodiments of the present invention will be described with reference to the accompanying drawings.

A service management device of the embodiment is realized by an arbitrary combination of hardware and software on the basis of a CPU, a memory, a program loaded into the memory (including a program previously stored in the memory from when shipping out the device and a program downloaded from a storage medium such as a CD, or a server or the like on the Internet) of an arbitrary computer, a storage unit such as a hard disk that stores the program, and an interface for network connection. In addition, one of ordinary skill in the art can understand that various modified examples of a realizing method and device can be made.

Functional block diagrams used in describing the embodiment show function-based blocks rather than hardware-based configurations. In the functional block diagrams, although description is given such that each device is realized by one equipment, a realizing unit thereof is not limited thereto. In other words, each device may be configured to be physically or logically separated.

First Embodiment

Figure 1:
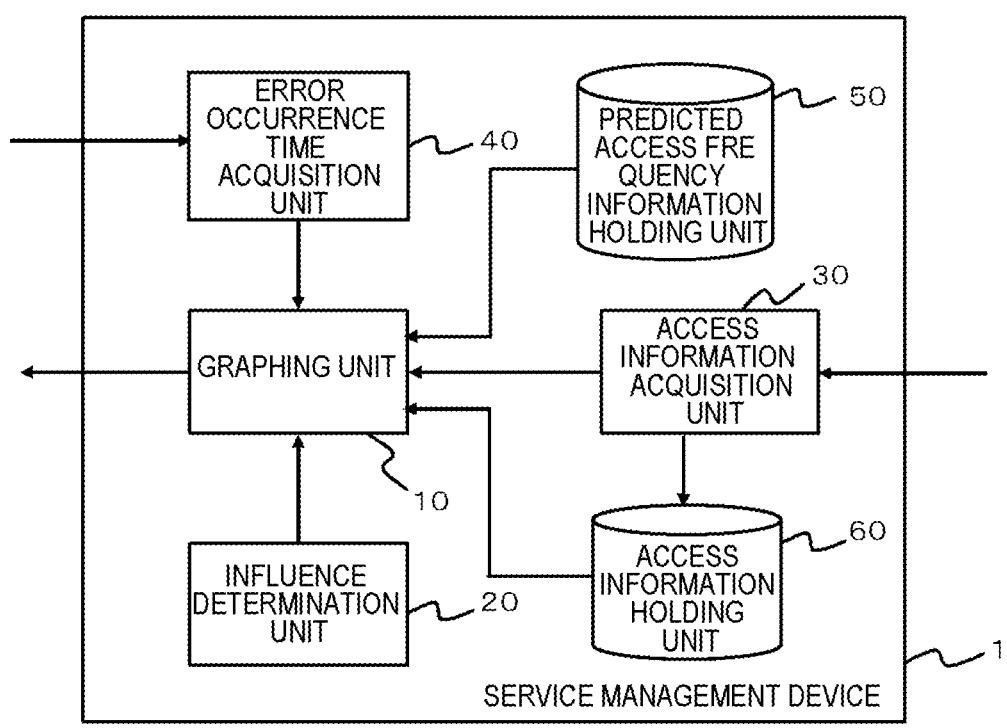
FIG. 1 is a functional block diagram showing an example of a configuration of a service management device of an embodiment of the present invention.

FIG. 1 is a functional block diagram showing an example of a configuration of a service management device 1 of the embodiment of the present invention. The service management device 1 of the embodiment shown in FIG. 1 includes a graphing unit 10, an influence determination unit 20, an access information acquisition unit 30, an error occurrence time acquisition unit 40, a predicted access frequency information holding unit 50, and an access information holding unit 60. The service management device 1 of the embodiment may be configured not to include the predicted access frequency information holding unit 50 and/or the access information holding unit 60. In this case, the constituent elements (the predicted access frequency information holding unit 50 and/or the access information holding unit 60) not included in the service management device 1 are provided in the device other than the service management device 1, and the device and the service management device 1 are configured to communicate with each other in a wired or wireless manner. In addition, the service management device 1 is configured to have access to the constituent elements included in another device and execute reading and/or writing processes of predetermined data. Hereinafter, the constituent elements included in the service management device 1 will be described.

The access information acquisition unit 30 acquires access information in which an access frequency indicating a number of accesses of a terminal device or the like to a predetermined service provided on a computer network is associated with information indicating an access time.

The predetermined service is not particularly limited and includes all types of services provided on a computer network such as the Internet or a Local Area Network (LAN). For example, the predetermined service may be a service that transmits a Web screen including predetermined information to a user terminal device having access to the service and receives applications for products purchasing from the Web screen.

In the embodiment, the access information acquisition unit 30 acquires access information in which an access frequency to a 'first service' and information indicating an access time are associated with each other.

The access information may be information indicating the access frequency in time zones (hereinafter, referred to as 'access time zone') with a predetermined width. FIG. 2 shows an example of the access information.

In an access information table 2a shown in FIG. 2, an 'access information ID', an 'access time zone', and an 'access frequency' are recorded in association with each other. The access information ID is information for identifying each of a plurality of pieces of access information. Each piece of the access information is associated with information for one day, that is, 1 day's worth of the access frequency in each of the time zones. The access information ID indicates the date of acquisition of the associated information, that is, the date of access to the service. Columns of the access time zone show time zones like 'A to B'. Time which is underlined means that the time zone includes the time, and time which is not underlined means that the time zone does not include the time.

According to the access information table 2a, it is seen that an access information ID '20101001' is information indicating the access frequency to the service on Oct. 1, 2010. It is also seen that the access frequency between '10:00 and 10:01' on Oct. 1, 2010 is '15,003,271', the access frequency between '10:01 and 10:02' is '14,989,222', and the access frequency between '10:02 and 10:03' is '15,121,384'.

Each piece of the access information may beset to, for example, 6 hours worth of information, 12 hours worth of information, or 3 days' worth of information, instead of information for one day. A width of the access time zone depends on a design matter and may be set to various time widths including 0.1 sec., 1 sec., 5 sec., 30 sec., 1 min., 5 min., 10 min., and the like. Here, the above-described examples are just examples, and the present invention is not limited thereto.

Although a unit for allowing the access information acquisition unit 30 to acquire the above-described access information is not particularly limited, the access information acquisition unit 30 may, for example, write the access information by acquiring service access logs including information indicating the access time to a predetermined service and by aggregating the service access logs.

A unit for acquiring the above-described service access logs may be realized according to the related art. For example, when the predetermined service corresponds one-to-one to a server providing the service, the access information acquisition unit 30 may acquire access logs to the server as service logs.

In addition, when the predetermined service does not correspond one-to-one to the server providing the service, for example, when one server provides a plurality of services, the access information acquisition unit 30 previously recognizes a predetermined Web page that is first requested by a user having access to the predetermined service. The access information acquisition unit 30 may extract an access log requesting the predetermined Web page from among the access logs of the server, and may acquire the extracted access log as a service log.

As another example in which the predetermined service does not correspond one-to-one to the server providing the service, when a plurality of servers having a redundant configuration provide one service, the access information acquisition unit 30 may acquire the access logs of all the plurality of servers as service access logs.

As another example in which the predetermined service does not correspond one-to-one to the server providing the service, when a plurality of servers having a redundant configuration provide a plurality of services, the access information acquisition unit 30 previously recognizes a predetermined Web page that is first requested by a user having access to the predetermined service. The access information acquisition unit 30 may extract an access log requesting the predetermined Web page from among the access logs of all the plurality of servers and may acquire the extracted access log as the service log.

A unit for allowing the access information acquisition unit 30 to acquire the service access log is just an example, and the unit may be realized using various other related arts according to service contents or a system configuration or the like for providing services.

A unit for allowing the access information acquisition unit 30 to aggregate the service access log and to write the above-described access information may be realized according to the related art, and thus a detailed description thereof will not be repeated here.

Each piece of the access information may include attribute information as shown in the access information table 2a of FIG. 2. The attribute information is associated with the access information ID. The attribute information includes an attribute that is an attribute of a date on which each piece of the access information is acquired (access date), and considered to have an influence on the access frequency to the service. For example, the attribute information may include one or more from among date, season, weather, highest temperature, and lowest temperature. The attribute information may include other pieces of information.

Although a unit for allowing the access information acquisition unit 30 to acquire the above-described attribute information is not particularly limited, the access information acquisition unit 30, for example, may previously hold positional information (URL or the like) of a predetermined server, have access to the server via the Internet, and acquire the above-described attribute information. Alternatively, the access information acquisition unit 30 may acquire the attribute information by receiving an input of the attribute information from a user.

The access information acquisition unit 30 may hold the acquired access information in the access information holding unit 60 shown in FIG. 1.

Referring back to FIG. 1, the predicted access frequency information holding unit 50 holds information (hereinafter, referred to as 'predicted access frequency information') indicating a predicted access frequency to a first service in a state where no error occurs in the first service.

The predicted access frequency information may be information indicating the predicted access frequency in each of the time zones with a predetermined width. Here, it is preferable that the width of the time zone coincide with the width of the access time zone.

The predicted access frequency information may be, for example, information (hereinafter, referred to as 'past record information') indicating a past access record itself to the first service. Alternatively, the predicted access frequency information may be information that is written by a user by using the past record information. In other words, the predicted access frequency information may be information that is newly written by a user by editing the past record information. FIG. 3 shows an example of the predicted access frequency information.

A configuration of a predicted access frequency information table 3a shown in FIG. 3 is the same as that of the access information table 2a shown in FIG. 2. In other words, the predicted access frequency information table 3a shows a 'predicted access frequency information ID', a 'time zone', and a 'predicted access frequency' that are associated with each other. The predicted access frequency information ID is information for identifying a plurality of pieces of predicted access frequency information. Each piece of the predicted access frequency information is associated with information for one day. The predicted access frequency information ID indicates a date. When the predicted access frequency information is the past record information, the predicted access frequency information ID indicates a date (access date to service) on which the past record information is acquired. In addition, when the predicted access frequency information is information that is written by editing the past record information, the predicted access frequency information ID indicates the date (access date to service) on which the edited past record information is acquired. Columns of the time zone show time zones like 'A to B'. A displaying technique thereof is the same as that described in the access information table 2a shown in FIG. 2.

Each piece of the predicted access frequency information may be set to, for example, 6 hours worth of information, 12 hours worth of information, or 3 days' worth of information, instead of information for one day. The predicted access frequency information holding unit 50 may be configured to hold only one piece of the predicted access frequency information rather than holding a plurality of pieces of the predicted access frequency information.

Each piece of the predicted access frequency information may include attribute information as shown in the predicted access frequency information table 3a of FIG. 3. The attribute information is associated with the predicted access frequency information ID. The attribute information is information indicating under what situation each piece of the predicted access frequency information is a predicted access frequency. In other words, the predicted access frequency associated with a predicted access frequency information ID '20091002' is information indicating the predicted access frequency corresponding to 'Friday' of the date, 'autumn' of the season, 'sunny' of the weather, '22.0° C.' of the highest temperature, '19.0° C.' of the lowest temperature. Here, the attribute information is information indicating an attribute that is considered to have an influence on the access frequency to the service, and the attribute information may be the same as the attribute information included in the above-described access information.

Figure 4:
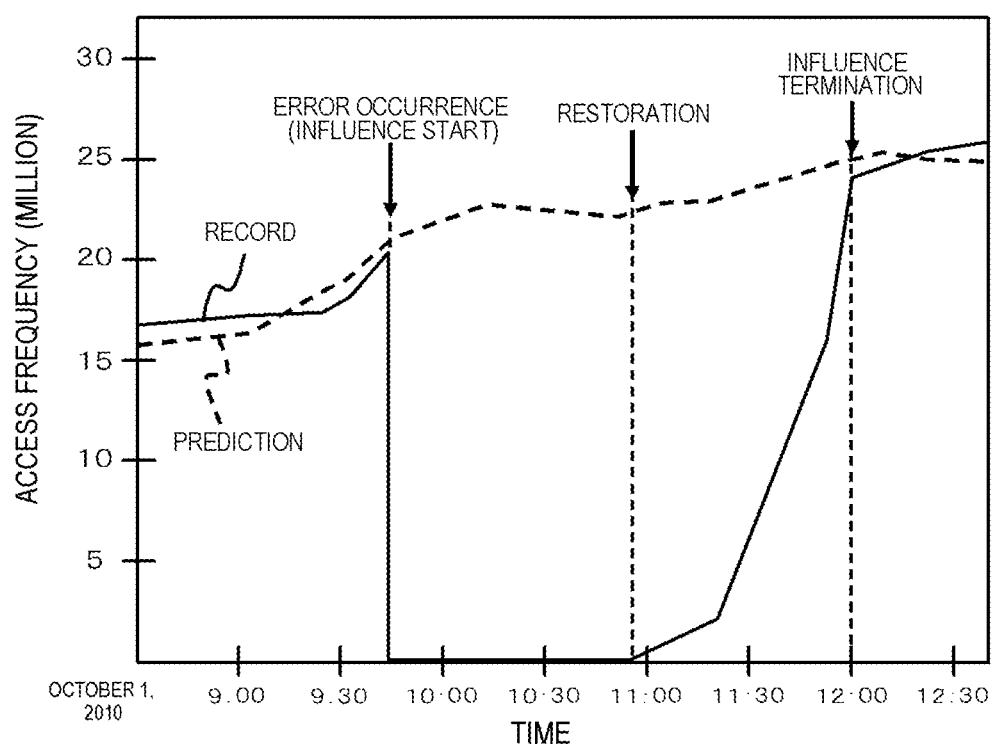
FIG. 4 is a graph for describing a configuration of a graphing unit of an embodiment of the present invention.

Referring back to FIG. 1, the graphing unit 10 displays, on an identical time series graph, the access frequency to the first service (hereinafter, referred to as 'actual access frequency') and the predicted access frequency to the first service (hereinafter, simply referred to as 'predicted access frequency') in a state where no error occurs in the first service. FIG. 4 shows an example of the graph display using the graphing unit 10.

The graph shown in FIG. 4 is a time series graph in which a vertical axis represents an access frequency to the service, a horizontal axis represents time, and the access frequency is plotted in a chronological order. In the time series graph shown in FIG. 4, the actual access frequency is indicated by a solid line as a 'record', and the predicted access frequency is indicated by a dashed line as a 'prediction'.

The graphing unit 10 may be previously configured to be able to use template data of the time series graph. The graphing unit 10 displays, on the time series graph, the access frequency in each of the time zones using the access information acquired from the access information acquisition unit 30 or the access information holding unit 60 so as to realize the graph display of the actual access frequency as shown in FIG. 4. The graphing unit 10 displays, on the time series graph, the predicted access frequency in each of the time zones using the predicted access frequency information acquired from the predicted access frequency information holding unit 50 so as to realize the graph display of the predicted access frequency as shown in FIG. 4.

When the predicted access frequency information holding unit 50 holds a plurality of pieces of the predicted access frequency information, the graphing unit 10 determines one piece of the predicted access frequency information used for the graph display as follows.

For example, the graphing unit 10 may determine one piece of the predicted access frequency information using the attribute information included in the access information (see FIG. 2) and the predicted access frequency information (see FIG. 3). Specifically, the graphing unit 10 may determine, as the predicted access frequency information used for the graph display, the predicted access frequency information in which the same day as a day included in the attribute information of the access information displayed to be superimposed thereon. The graphing unit 10 may determine, as the predicted access frequency information used for the graph display, the predicted access frequency information in which the same season or weather as the season or weather included in the attribute information of the access information displayed to be superimposed thereon. In addition, the graphing unit 10 may determine, as the predicted access frequency information used for the graph display, the predicted access frequency information in which the highest temperature or the lowest temperature that is within a predetermined difference (for example, within 1° C.) from the highest temperature or the lowest temperature included in the attribute information of the access information displayed to be superimposed thereon. In addition, the graphing unit 10 may determine, as the predicted access frequency information used for graph display, the predicted access frequency information constituted by the past record information that is acquired on the same month as a month (access month) on which the access information displayed to be superimposed thereon is acquired using the access information ID and the predicted access frequency information ID, or the predicted access frequency information written using the past record information.

In addition, the graphing unit 10 may receive an input to select one piece of the predicted access frequency information from a user and determine the predicted access frequency information selected by the user as the predicted access frequency information used for the graph display. At this time, the graphing unit 10 may output, as a material used for determination for the user to select the one piece of the predicted access frequency information, attribute information associated with the predicted access frequency information to the user, for example, using an output device such as a display.

Here, the above-described 'previous configuration to be able to use data' may be a configuration in which the data is stored in the service management device 1 in advance and can be used by extraction from the service management device. Alternatively, the data may be previously stored in a device that is different from the service management device 1 and may be configured to communicate with the service management device 1 in a wired or wireless manner so as to use the data received from the device.

Referring back to FIG. 4, the graphing unit 10 displays on the time series graph, when an error occurs in the first service, the time at which the error occurs (hereinafter, referred to as 'error occurrence time'). Although a unit for displaying the error occurrence time is not particularly limited, the error occurrence time may be displayed using a combination of a dotted line, an arrow, and a character, for example, as shown in FIG. 4. According to the time series graph shown in FIG. 4, it is seen that the time around 9:45 is the error occurrence time.

Here, the service management device 1 of the embodiment may determine the error occurrence time as time when the error starts to influence the first service (hereinafter, referred to as 'influence start time'). Accordingly, the graphing unit 10 may display the time that is the same as the error occurrence time as the influence start time, for example, as shown in FIG. 4. Although a unit for displaying the influence start time is not particularly limited, the influence start time may be displayed using a combination of the dotted line, the arrow, and the character, for example, as shown in FIG. 4. According to the time series graph shown in FIG. 4, it is seen that the time around 9:45 is the influence start time.

The graphing unit 10 displays, on the time series graph, time when the error occurring in the first service no longer influences the first service provision (hereinafter, referred to as 'influence termination time'). Although a unit for displaying the influence termination time is not particularly limited, the influence termination time may be displayed using a combination of the dotted line, the arrow, and the character, for example, as shown in FIG. 4. According to the time series graph shown in FIG. 4, it is seen that the time around 12:00 is the influence termination time.

The graphing unit 10 acquires information indicating an error occurrence time from the error occurrence time acquisition unit 40 to be described below and realizes specifying the error occurrence time (influence start time) and displaying it on the time series graph using the acquired information indicating the error occurrence time. In addition, the graphing unit 10 acquires predetermined information from the influence determination unit 20 to be described below and realizes specifying the influence termination time and displaying it on the time series graph using the acquired information.

The time series graph displayed by the graphing unit 10, for example, the time series graph shown in FIG. 4 may be moved in a scroll manner in a time axis direction. In such a case where the time series graph is present on a data indicated by the information corresponding to a date indicated by the time axis after the movement in the scroll manner, that is, a data indicated by the actual access frequency and the predicted access frequency on a date indicated by the time axis after the movement in the scroll manner, information indicating the error occurrence time, the influence start time, the influence termination time, and a restoration time is graphically displayed.

Referring back to FIG. 1, the error occurrence time acquisition unit 40 acquires, if an error occurs in the first service, information indicating the error occurrence time (hereinafter, referred to as 'error occurrence time information'). Various types of errors may occur in the first service, and examples of the errors in the first service may include at least one from among an error in which the first service is not normally operated, an error in which a server providing the first service has a redundant configuration and thus the redundant configuration collapses, and an error in which a response time of the server providing the first service becomes later than a predetermined time (design matter). These are just examples, and other types of errors may be included.

Although a unit for allowing the error occurrence time acquisition unit 40 to acquire the error occurrence time information is not particularly limited, the error occurrence time information may be acquired from, for example, a monitoring unit that monitors occurrence of the above-described errors. Alternatively, the error occurrence time acquisition unit 40 may acquire information indicating that an error has occurred, from the monitoring unit and acquire the time at which the information is acquired from, for example, a clock included in the service management device 1 so as to set the information and the time as the error occurrence time information. A configuration of the monitoring unit may be realized according to the related art.

If the error occurrence time acquisition unit 40 acquires the error occurrence time information, the error occurrence time acquisition unit 40 may store in a memory, the error occurrence time information in association with information for identifying an error occurrence date. The memory may be a memory included in the service management device 1 or a memory included in another device, and at least the graphing unit 10 is required to be accessible to the memory. Here, FIG. 5 shows an example of a table (hereinafter, referred to as 'error occurrence time table 5a') in which the error occurrence time information is recorded in association with the information for identifying the error occurrence date. In the error occurrence time table 5a shown in FIG. 5, an access information ID is recorded as the information for identifying the error occurrence date.

Referring back to FIG. 1, the influence determination unit 20 determines the time when the error occurring in the first service no longer influences the first service provision (influence termination time) on the basis of a relationship between the actual access frequency (line shown as 'record') and the predicted access frequency (line shown as 'prediction') on the time series graph (see FIG. 4).

For example, the influence determination unit 20 may determine, if a difference between the predicted access frequency and the actual access frequency ('predicted access frequency'–'actual access frequency') in the same time zone after the error occurrence time (influence start time) becomes a predetermined value or less or becomes smaller than the predetermined value, the time as the influence termination time. Alternatively, the influence determination unit 20 may determine, when the difference becomes the predetermined value or less or becomes smaller than the predetermined value and then a state thereof is continued for a predetermined time, the time when the difference becomes the predetermined value or less or becomes smaller than the predetermined value as the influence termination time. The predetermined value and the predetermined time are design matters. In addition, the predetermined value may include zero.

Alternatively, the influence determination unit 20 may determine, if a difference between the predicted access frequency and the actual access frequency ('predicted access frequency'–'actual access frequency') in the same time zone after the error occurrence time (influence start time) becomes equal to or less than a predetermined ratio of a maximum value of a difference between the predicted access frequency and the actual access frequency ('predicted access frequency'–'actual access frequency') in the same time zone after the error occurrence time (influence start time) or becomes smaller than the predetermined ratio, the time as the influence termination time. Alternatively, the influence determination unit 20 may determine, when the difference becomes equal to or less than the predetermined ratio or becomes smaller than the predetermined ratio and then the state is continued for a predetermined time, the time when the difference becomes equal to or less than the predetermined ratio or becomes smaller than the predetermined ratio as the influence termination time. The predetermined ratio and the predetermined time are design matters. In addition, the predetermined ratio may include zero.

In addition, as shown in FIG. 4, the graphing unit 10 may display time when the error occurring in the first service is restored (hereinafter, referred to as 'error restoration time') on the time series graph. Although a unit for displaying the error restoration time is not particularly limited, the error restoration time may be displayed, for example, using a combination of the dotted line, the arrow, and the character as shown in FIG. 4. According to the time series graph shown in FIG. 4, it is seen that the time around 10:50 is the error restoration time. The graphing unit 10 acquires information indicating the error restoration time, for example, from the above-described monitoring unit to specify and graphically display the error restoration time.

Next, an example of the processing flow of the service management device 1 of the embodiment will be described with reference to FIGS. 1 to 6.

Figure 6:
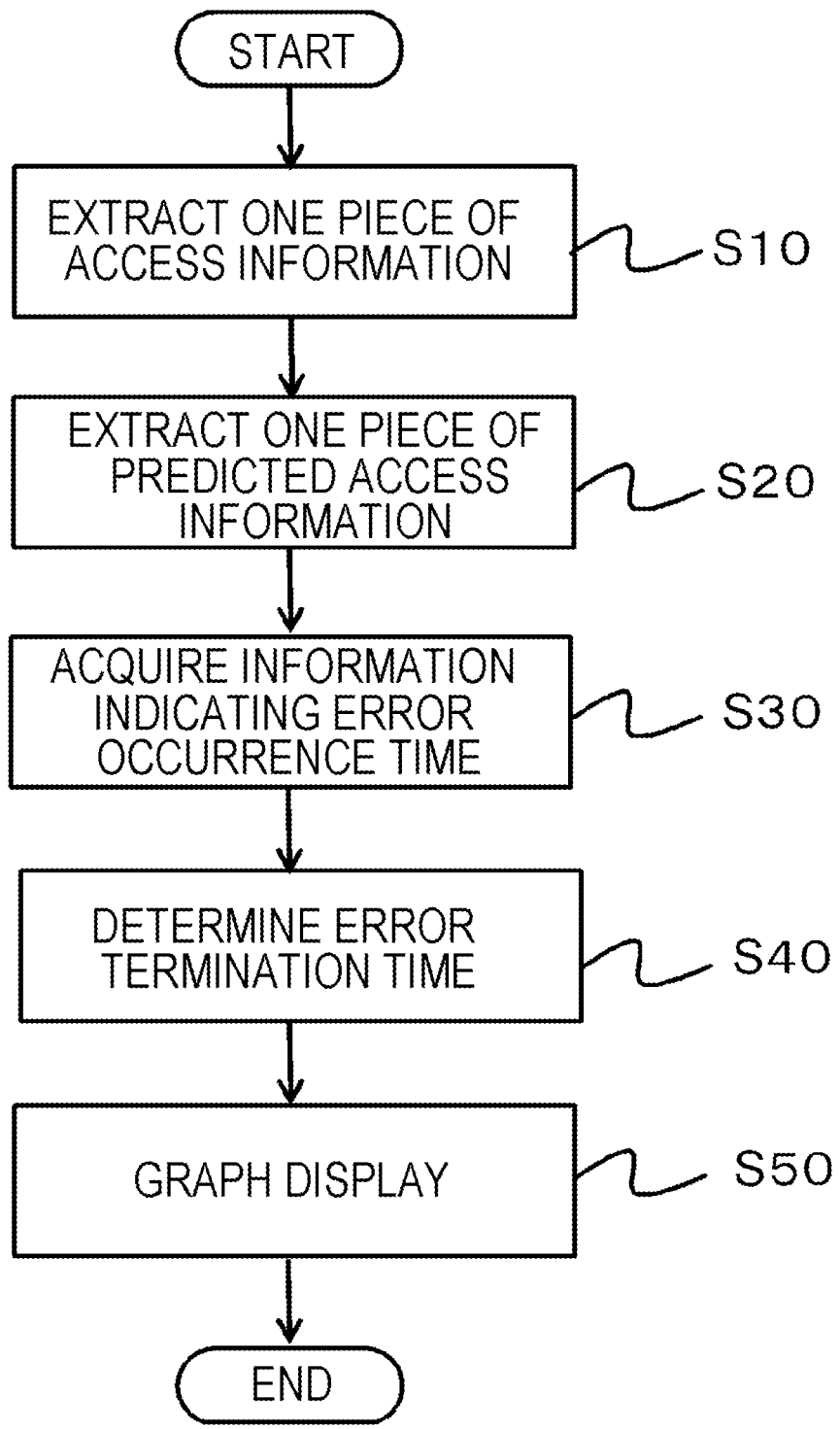
FIG. 6 is a flow chart showing an example of the flow of processing of the service management device of the embodiment of the present invention.

First, the graphing unit 10 shown in FIG. 1 extracts one piece of the access information from the access information acquisition unit 30 or the access information holding unit 60 (S10 of FIG. 6).

For example, the graphing unit 10 receives an input to designate one piece of the access information from a user and extracts the designated access information from the access information acquisition unit 30 or the access information holding unit 60. As a specific example, the graphing unit 10 receives an input of an access date from a user, searches an access information ID indicating the access date in the access information table 2a shown in FIG. 2 using the access date as a key, and extracts the one piece of the access information.

Next, the graphing unit 10 shown in FIG. 1 extracts one piece of the predicted access frequency information from the predicted access frequency information holding unit 50 (S20 of FIG. 6).

For example, the graphing unit 10 extracts the predicted access frequency information in which predetermined attribute information corresponds to that included in the access information, on the basis of the attribute information (see FIG. 2) included in the access information extracted in S10 and the attribute information (see FIG. 3) included in the predicted access frequency information held by the predicted access frequency information holding unit 50. As a more specific example, the graphing unit 10 extracts one of the predicted access frequency information in which the day, the season, and the weather included in the attribute information correspond to those included in the access information extracted in S10.

Thereafter, the graphing unit 10 shown in FIG. 1 acquires information indicating the error occurrence time (S30 of FIG. 6).

For example, the graphing unit 10 acquires information indicating the error occurrence time associated with an access information ID of the access information extracted in S10 with reference to the error occurrence time table 5a shown in FIG. 5 that is recorded by the error occurrence time acquisition unit 40.

Thereafter, the influence determination unit 20 shown in FIG. 1 determines an error termination time using information indicating the access information extracted in S10, the predicted access frequency information extracted in S20, and the error occurrence time acquired in S30 (S40 of FIG. 6).

For example, the influence determination unit 20 calculates a difference between the predicted access frequency and the actual access frequency ('predicted access frequency'–'actual access frequency') in the same time zone after the error occurrence time (influence occurrence time). Subsequently, the influence determination unit 20 compares sizes of the calculated difference and a predetermined value. When the calculated difference is equal to or less than the predetermined value or less than the predetermined value, the influence determination unit 20 then determines a time zone thereof to be the influence termination time.

Thereafter, the graphing unit 10 shown in FIG. 1 graphically displays the actual access frequency and the predicted access frequency shown in FIG. 4 using the access information extracted in S10 and the predicted access frequency information extracted in S20. In addition, as shown in FIG. 4, the graphing unit 10 also displays the error occurrence time (influence start time) using information indicating the error occurrence time acquired in S30. Further, as shown in FIG. 4, the graphing unit 10 displays of the influence termination time using the information determined in S40 (S50 of FIG. 6).

The service management device 1 of the embodiment may be realized, for example, by installing the following program in a computer.

The program for causing a computer to function as a graphing unit, the graphing unit that graphically displays, on an identical time series graph, an access frequency to a predetermined service provided on a computer network and a predicted access frequency to the service in a state where no error occurs in the service, and displays an error occurrence time, on the time series graph, when the error occurs in the service.

Subsequently, operations and effects of the service management device 1 of the embodiment will be described.

The service management device 1 of the embodiment, as shown in FIG. 4, may display the actual access frequency, the predicted access frequency, the error occurrence time (influence start time), and the influence termination time on an identical time series graph.

According to the service management device 1 of the embodiment, if any error occurs in a service, a user may easily ascertain the degree of influence on the service provision due to the error using a difference between an actual access frequency and a predicted access frequency before an influence termination time after an error occurrence time (influence start time).

Figure 7:
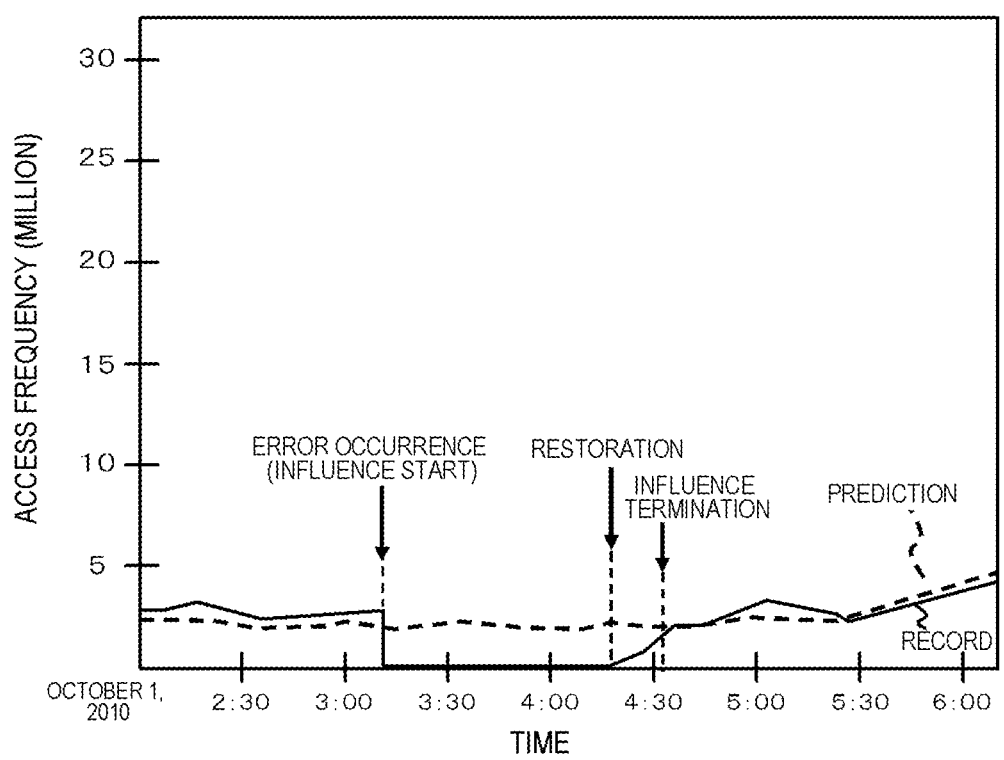
FIG. 7 is a graph for describing a configuration of the graphing unit of the embodiment of the present invention.

Here, FIG. 7 shows another example of the graph display realized by the service management device 1 of the embodiment. In the graph shown in FIG. 4 and the graph shown in FIG. 7, moments of time displayed on the graphs are different from each other.

According to the graph shown in FIG. 4, it is seen that the time around 9:45 is the error occurrence time (influence start time) and the time around 12:00 is the influence termination time. In addition, it is seen that the time around 10:50 is the error restoration time. In other words, it is seen that even though the service is restored from the error, the influence of the error remains, and the error no longer influences the service provision after approximately 1 hour and 10 minutes has elapsed after the restoration of the service from the error.

According to the graph shown in FIG. 7, it is seen that the time around 3:10 is the error occurrence time (influence start time) and a moment which is slightly later than 4:30 is the influence termination time. In addition, it is seen that the time around 4:15 is the error restoration time. In other words, it is seen that even though the service is restored from the error, the influence of the error remains, and the error no longer influences the service provision after approximately 15 minutes has elapsed after the restoration of the service from the error.

Comparing FIGS. 4 and 7, it is easily seen that even though an error occurs at time shown in the graph of FIG. 7, that is, in the early morning when a user's utilization frequency is low, the degree of influence is comparatively low. On the other hand, it is easily seen that when an error occurs at time shown in the graph of FIG. 4, that is, at time when a user's utilization frequency is high, the degree of influence is high.

Second Embodiment

The service management device 1 of the embodiment has the same configuration as the service management device 1 of the first embodiment except that the configuration of the graphing unit 10 is partially different. An example of the configuration of the service management device 1 of the embodiment is shown using the functional block diagram of FIG. 1. Hereinafter, the graphing unit 10 will be described.

Figure 8:
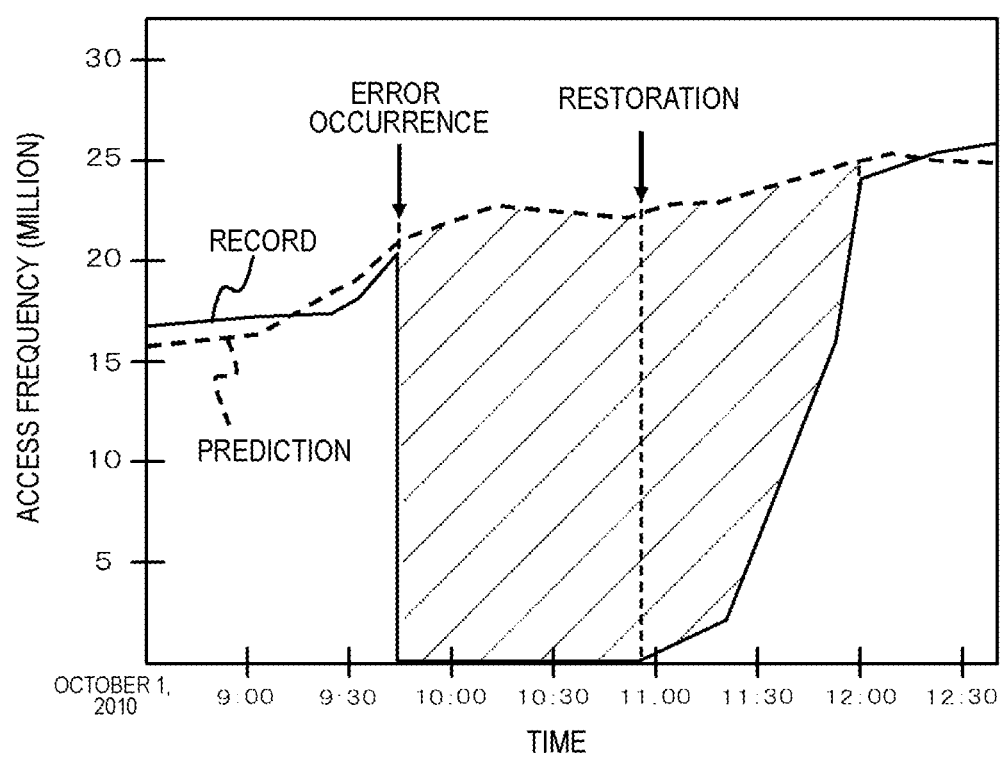
FIG. 8 is a graph for describing a configuration of the graphing unit of the embodiment of the present invention.

The graphing unit 10 displays, as shown in FIG. 8, an actual access frequency and a predicted access frequency on a time series line graph. In FIG. 8, the actual access frequency is indicated by a solid line shown as a 'record', and the predicted access frequency is indicated by a dashed line shown as a 'prediction'.

The graphing unit 10 distinctly displays, as information indicating the degree of influence on the service provision due to an error, an area (hereinafter, referred to as 'influence degree area') that is interposed between a line indicating an access frequency after an error occurrence time (influence start time) and before an influence termination time and a time zone section indicating a predicted access frequency having a value greater than the access frequency in a line indicating a predicted access frequency. In other words, in FIG. 8, the graphing unit 10 distinctly displays, as information indicating the degree of influence on the service provision due to an error, an area that is interposed between the line indicating the access frequency after the error occurrence time (influence start time) and before the influence termination time and a section positioned above the line indicating the access frequency in the line indicating the predicted access frequency. A unit for distinctly displaying the area is not particularly limited. For example, in addition to drawing a diagonal line in the influence degree area as shown in FIG. 8, the influence degree area may be colored, or alternatively, an outline of the influence degree area may be indicated by a heavy line or a colored line.

In this case, the graphing unit 10 may show the influence start time and the influence termination time by distinctly displaying the influence degree area, and thus it is not necessary to display the influence start time and the influence termination time using a combination of the dotted line, the arrow, and the character as shown in FIG. 4. According to the graph shown in FIG. 8, it is seen that the time around 9:45 is the influence start time and the time around 12:00 is the influence termination time.

According to the service management device 1 of the embodiment, if any error occurs in a service, a user may easily ascertain the degree of influence on the service provision due to the error using a size of the area that is distinctly displayed.

Third Embodiment

The service management device 1 of the embodiment has the same configuration as the service management devices 1 of the first and second embodiments except that the access information acquisition unit 30 processes the latest access log in real time to acquire access information and that the graphing unit 10 processes the access information acquired in real time by the access information acquisition unit 30 to graphically display the access information. An example of the configuration of the service management device 1 of the embodiment is shown using the functional block diagram of FIG. 1.

Figure 9:
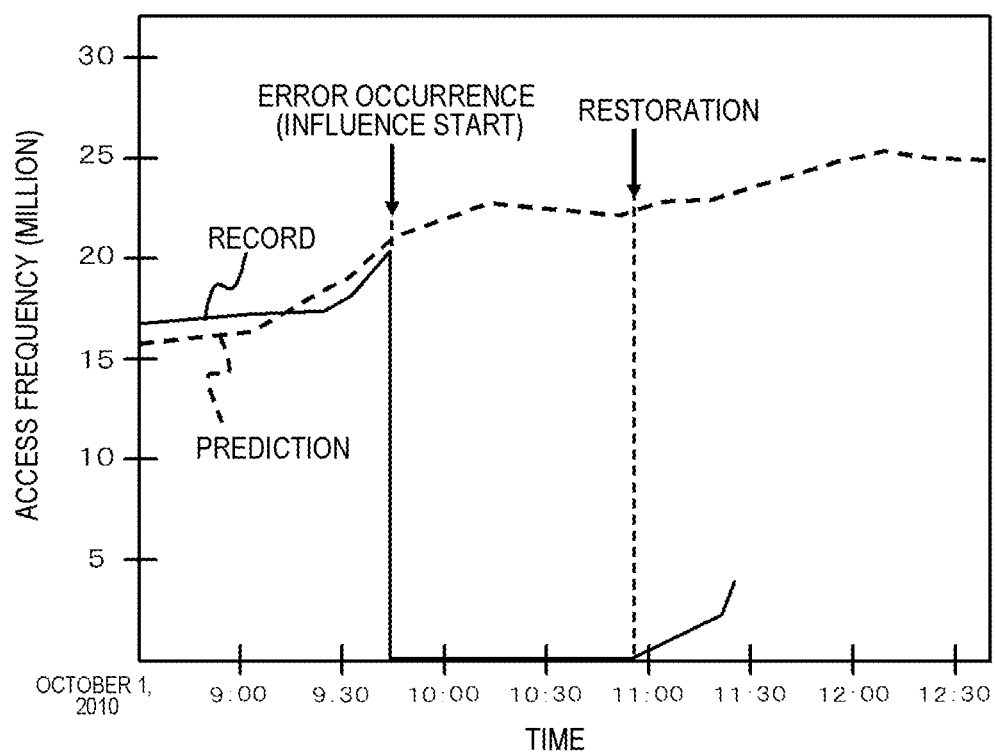
FIG. 9 is a graph for describing a configuration of the graphing unit of the embodiment of the present invention.
Figure 10:
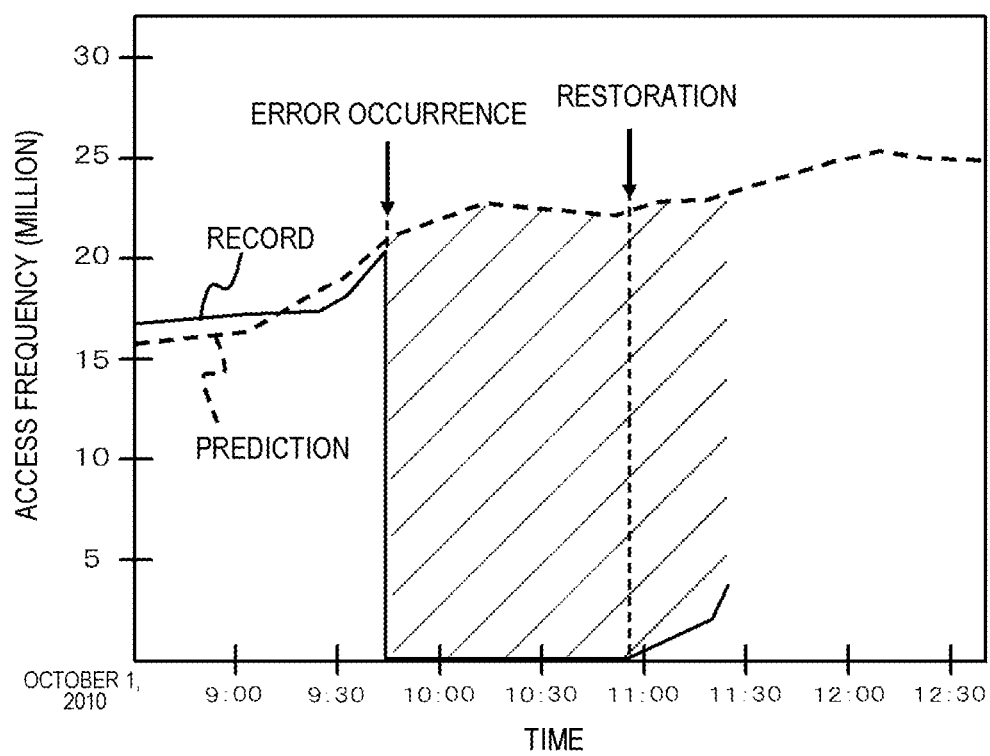
FIG. 10 is a graph for describing a configuration of the graphing unit of the embodiment of the present invention.

Here, FIGS. 9 and 10 show examples of a graph display using the graphing unit 10 of the embodiment. FIG. 9 shows the graph display based on the configuration of the first embodiment, and FIG. 10 shows the graph display based on the configuration of the second embodiment.

According to the graphs shown in FIGS. 9 and 10, it is seen that the time around 9:45 is an error occurrence time (influence start time), and the time around 10:50 is an error restoration time. It is also seen that a present time is slightly before 11:30 and that an error is still influencing a service provision at the present time.

In the embodiment, the graphing unit 10 determines one piece of the predicted access frequency information used for the graph display as follows.

For example, the graphing unit 10 may receive an input to select one piece of the predicted access frequency information from a user and determine the selected predicted access frequency information as predicted access frequency information used for a graph display. At this time, the graphing unit 10 may output, as a material used for determination performed when the user selects the one piece of the predicted access frequency information, attribute information associated with each piece of the predicted access frequency information to the user through an output device such as a display.

In addition, the graphing unit 10 may determine one piece of the predicted access frequency information using the attribute information included in the predicted access frequency information. Specifically, the graphing unit 10 may previously hold positional information (URL or the like) of a predetermined server, have access to the server via the Internet, and acquire information indicating a situation (day, weather, and the like) of the day. The graphing unit 10 may determine, as the predicted access frequency information used for the graph display, the predicted access frequency information in which the acquired situation (for example, sunny, Monday, and the like) is included in the attribute information. The graphing unit 10 may also determine one piece of the predicted access frequency information as the predicted access frequency information used for the graph display according to the month of the day in the same manner as the first embodiment.

According to the service management device 1 of the embodiment, in addition to operations and effects realized in the first and second embodiments, a user may easily ascertain in real time, if an error occurs in a service, the degree of influence on the service provision due to the error, that is, the degree of influence of the error has influenced the service provision up to that moment of time.

Fourth Embodiment

The service management device 1 of the embodiment has the same configuration as those of the service management devices 1 of the first to third embodiments except that the predicted access frequency information held by the predicted access frequency information holding unit 50 is newly written by the service management device 1 using the past record information described in the first embodiment.

Figure 11:
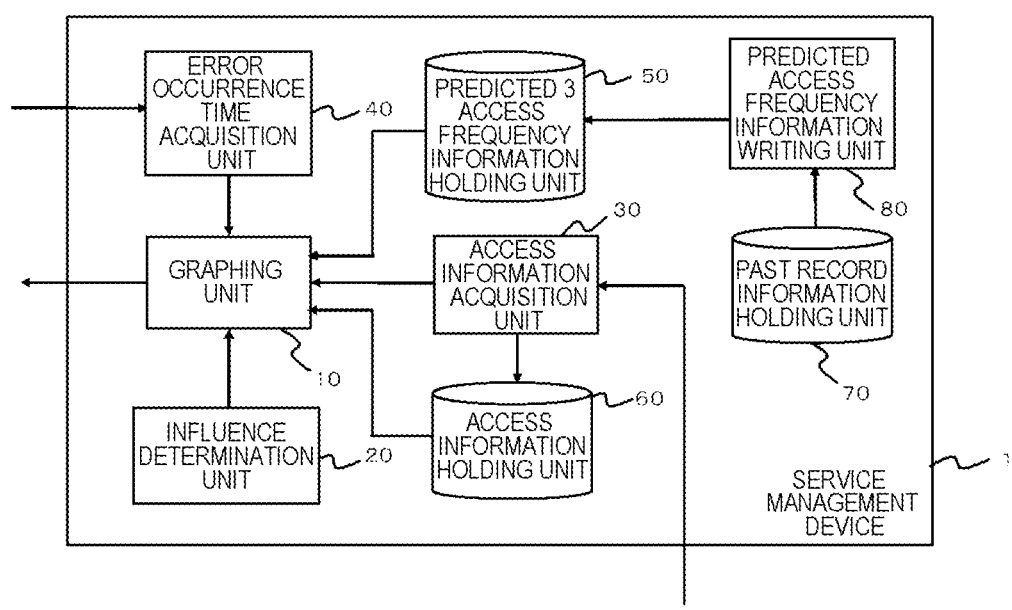
FIG. 11 is an example of a functional block diagram of the service management device of the embodiment of the present invention.

FIG. 11 is a functional block diagram showing an example of a configuration of the service management device 1 of the embodiment. The service management device 1 of the embodiment shown in FIG. 11 includes the graphing unit 10, the influence determination unit 20, the access information acquisition unit 30, the error occurrence time acquisition unit 40, the predicted access frequency information holding unit 50, the access information holding unit 60, a past record information holding unit 70, and a predicted access frequency information writing unit 80. Hereinafter, a configuration of each unit will be described.

The past record information holding unit 70 holds past record information. The past record information is as described in the first embodiment, and thus a description thereof will not be repeated here. The past record information holding unit 70 holds, for example, a past record information table 17a as shown in FIG. 17. A configuration of the past record information table 17a is the same as that of the access information table 2a shown in FIG. 2, and thus a description thereof will not be repeated here. In addition, for convenience of the description, although the past record information table 17a is provided separately from the access information table 2a, the access information table 2a itself may be used as the past record information table 17a.

The predicted access frequency information writing unit 80 writes predicted access frequency information on the basis of the past record information held by the past record information holding unit 70. The predicted access frequency information is as described in the first embodiment, and thus a description thereof will not be repeated here.

A unit for allowing the predicted access frequency information writing unit 80 to write the predicted access frequency information may be, for example, the following unit.

First, the predicted access frequency information writing unit 80 extracts a plurality of pieces of the past record information sharing predetermined attribute information from among the plurality pieces of the past record information (see FIG. 17). For example, the predicted access frequency information writing unit 80 extracts the past record information sharing, for example, day, season, and weather. In addition, the predicted access frequency information writing unit 80 may extract the past record information of the same month on the basis of a past record information ID. The predicted access frequency information writing unit 80 writes one piece of the predicted access frequency information using the extracted plurality of pieces of the past record information. For example, the predicted access frequency information writing unit 80 may cause the access frequency for every time zone to be averaged using the plurality of pieces of the past record information so as to set the averaged access frequency as one piece of the predicted access frequency information. The predicted access frequency information writing unit 80 may include the attribute information used for extraction of the past record information as the attribute information included in the predicted access frequency information.

The service management device 1 of the embodiment may write one piece of the access frequency information using the plurality of pieces of the past record information sharing attributes included in the plurality of pieces of the past record information.

The service management device 1 of the embodiment, in addition to operations and effects realized in the first to third embodiments, may improve the quality as reference data of the predicted access frequency displayed to be superimposed on the actual access frequency. As a result, when any error occurs in a service, a user may easily ascertain the degree of influence on the service provision due to the error with a sufficient accuracy.

Fifth Embodiment

The access information acquisition unit 30 of the embodiment has the same configuration as the service management devices 1 of the first to fourth embodiments except that the configuration of the influence determination unit 20 is different. An example of the configuration of the service management device 1 of the embodiment is shown as the functional block diagram of FIG. 1 or 11.

Figure 12:
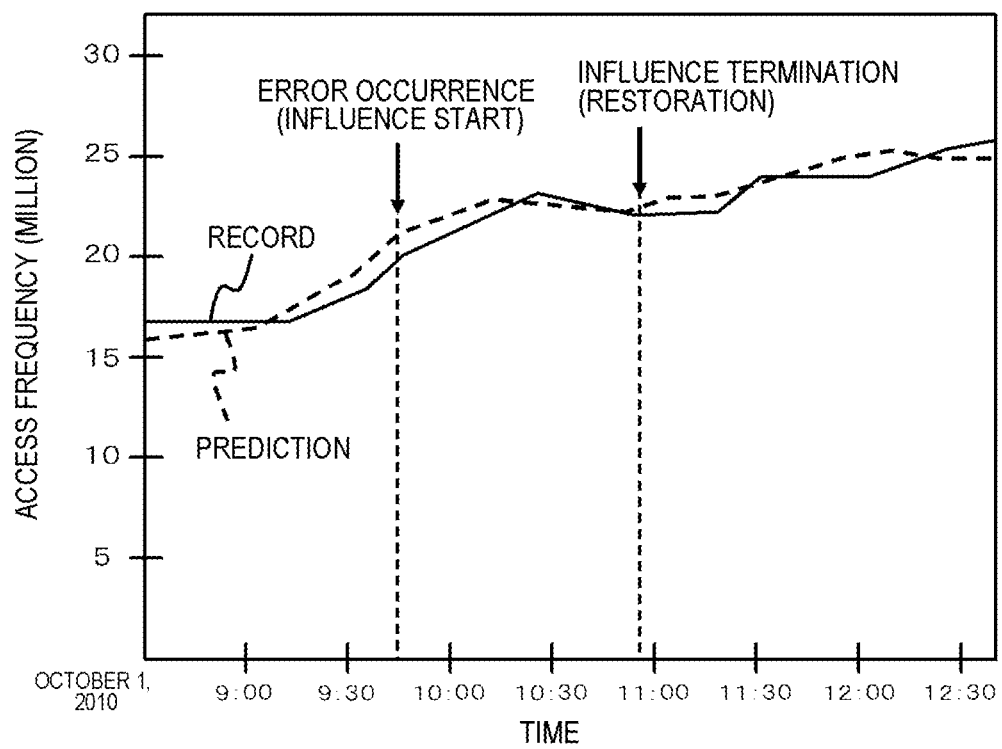
FIG. 12 is a graph for describing a configuration of the graphing unit of the embodiment of the present invention.

Here, FIG. 12 shows an example of a graph display realized by the service management device 1 of the embodiment. As shown in FIG. 12, even though an error occurs, the degree of influence on the service provision due to the error may be low depending on contents of the error. For example, when the contents of the occurred error is an error in which a redundant configuration of a server providing the service collapses, even though the redundant configuration collapses, if a preliminary server is normally operated, the error has little influence on the service provision.

In this case, there is a possibility that the influence determination units 20 of the first to fourth embodiments may not be able to appropriately determine the influence termination time. In the first to fourth embodiments, the influence determination unit 20 is configured to determine, if the difference between the predicted access frequency and the actual access frequency ('predicted access frequency'–'actual access frequency') in the same time zone after the error occurrence time (influence start time) becomes a predetermined value or less or becomes smaller than the predetermined value, the time as the influence termination time. However, when an error has little influence on the service provision, there is a possibility that the difference does not become the predetermined value or more or may not become greater than the predetermined value between the time after the error occurrence time (influence start time) and the time before the error restoration time. In this case, there is a possibility that the influence determination unit 20 having the above-described configuration may not be able to appropriately determine the influence termination time.

Accordingly, the influence determination unit 20 of the embodiment may determine, if the difference between the predicted access frequency and the actual access frequency ('predicted access frequency'–'actual access frequency') in the same time zone does not become the predetermined value or more or does not become greater than the predetermined value between the time after the error occurrence time (influence start time) and the time before the error restoration time, the error restoration time as the influence termination time.

The influence determination unit 20 of the embodiment determines the influence termination time in the same manner as the first to fourth embodiments when the difference between the predicted access frequency and the actual access frequency ('predicted access frequency'–'actual access frequency') in the same time zone does not become the predetermined value or more or does not become greater than the predetermined value between the time after the error occurrence time (influence start time) and the time before the error restoration time.

The service management device 1 of the embodiment, in addition to the operations and effects realized in the first to fourth embodiments, may appropriately determine the influence termination time even when an error has little influence on the service provision.

Hereinafter, other examples of the graph display realized by the service management devices 1 of the first to fifth embodiments will be described with reference to FIGS. 13 to 16.

Figure 13:
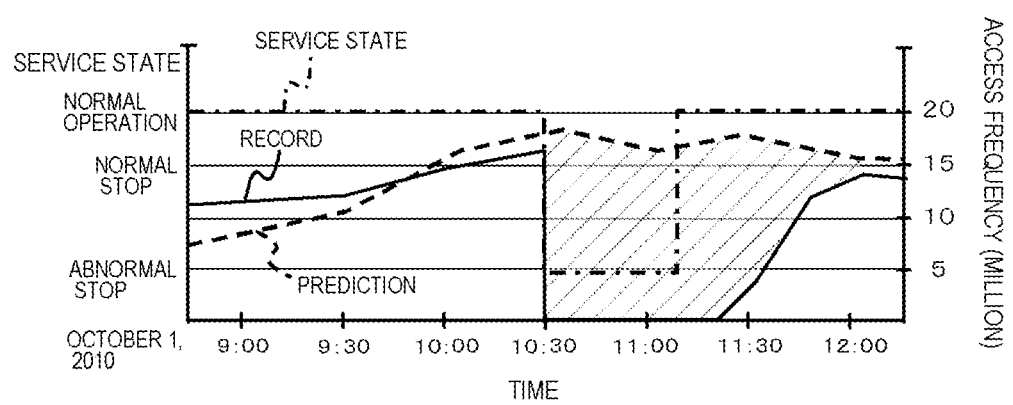
FIG. 13 is a graph for describing a configuration of the graphing unit of the embodiment of the present invention.

The graph shown in FIG. 13 is different from the graphs described in the first to fifth embodiments in that service states are graphically displayed to be superimposed with each other. In other words, a dashed line shown as a 'service state' is shown in the graph shown in FIG. 13. The line shows service states in time zones by being positioned at any one level from among 'normal operation', 'normal stop', and 'abnormal stop' shown in a vertical axis on the left. The 'normal operation' represents that the service is normally being operated. The 'normal stop' represents that the service is normally stopped due to, for example, the manipulation of an operator. The 'abnormal stop' means an abnormal state in which the service is stopped due to any error having occurred in the service. According to the graph shown in FIG. 13, there is no need to display the error occurrence time and the error restoration time using a combination of the dotted line, the arrow, and the character.

According to the graph shown in FIG. 13, it is seen that the time around 10:30 is the error occurrence time (influence start time) and the time around 12:00 is the influence termination time. In addition, the time around 11:10 is the error restoration time.

Figure 14:
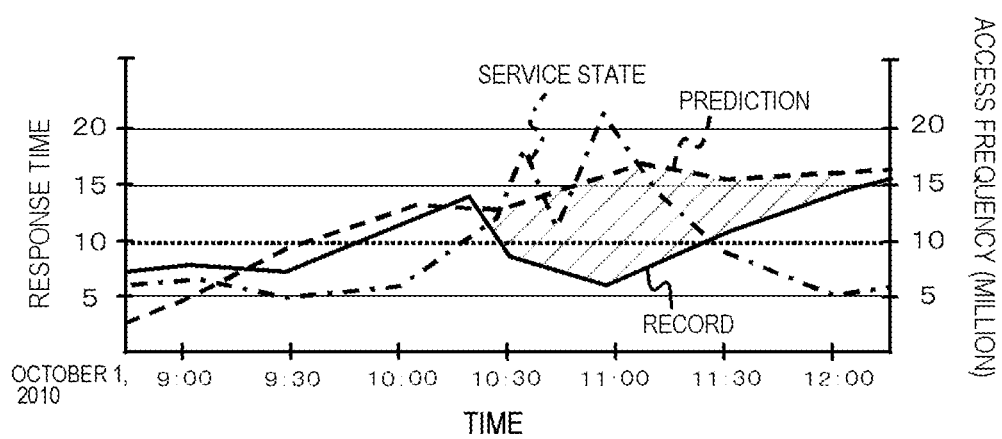
FIG. 14 is a graph for describing a configuration of the graphing unit of the embodiment of the present invention.

The graph shown in FIG. 14 is different from the graphs described in the first to fifth embodiments in that the moments of response time of a server providing a service are graphically displayed to be superimposed with each other. In other words, the dashed line shown as the 'service state' is shown in the graph in FIG. 14. The line shows the moments of response time in time zones by the response time shown in a vertical axis on the left. Being detected as an error if the response time is later than 10 seconds is shown by the dotted line indicating the response time '10 sec.' in FIG. 14. According to the graph shown in FIG. 14, there is no need to display the error occurrence time and the error restoration time using a combination of the dotted line, the arrow, and the character.

According to the graph shown in FIG. 14, it is seen that the time around 10:30 is the error occurrence time (influence start time) and that the time around 12:00 is the influence termination time. It is also seen that the error restoration time is slightly before 11:30.

Figure 15:
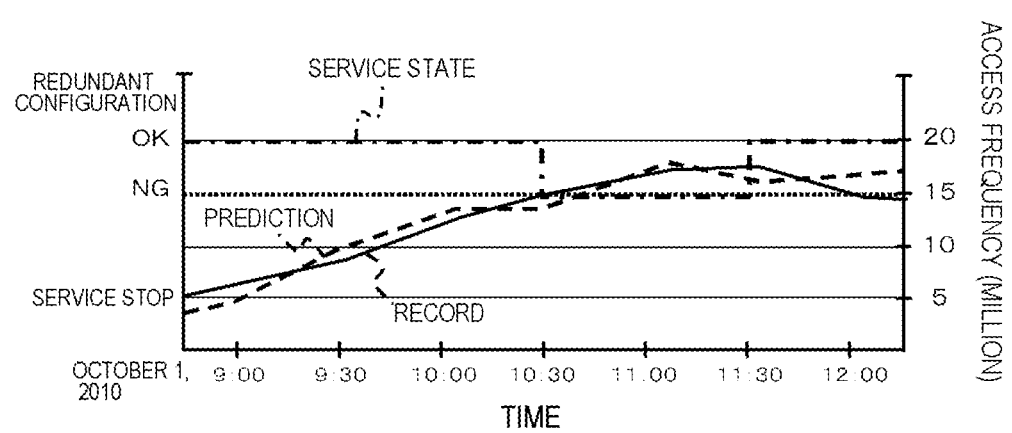
FIG. 15 is a graph for describing a configuration of the graphing unit of the embodiment of the present invention.

The graph shown in FIG. 15 is different from the graphs described in the first to fifth embodiments in that states of a redundant configuration of a server providing a service are graphically displayed to be superimposed with each other. In other words, the dashed line shown as the 'service state' is shown in the graph shown in FIG. 15. The line shows service states in time zones by being positioned at any one level from among 'OK', 'NG', and 'service stop' shown in a vertical axis on the left. The 'OK' represents that a redundant configuration is held. The 'NG' represents that although the redundant configuration collapses, a preliminary server is normally being operated and thus the service is normally being operated. The 'service stop' represents that the redundant configuration collapses and an error occurs in the preliminary server, and thus the service is stopped. According to the graph, there is no need to display the error occurrence time and the error restoration time using a combination of the dotted line, the arrow, and the character.

According to the graph shown in FIG. 15, it is seen that the time around 10:15 is the error occurrence time (influence start time) and that the time around 11:30 is the influence termination time. It is also seen that the time around 11:30 is the error restoration time.

Figure 16:
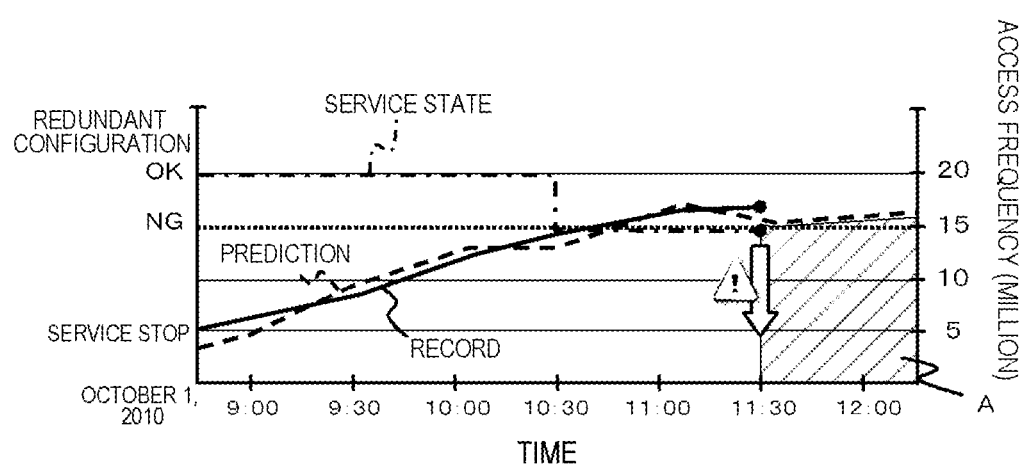
FIG. 16 is a graph for describing a configuration of the graphing unit of the embodiment of the present invention.

The graph shown in FIG. 16 is a graph in which a real time display described in the third embodiment is performed. The graph shown in FIG. 16 is different from the graphs described in the first to fifth embodiments in that states of a redundant configuration of a server providing a service are graphically displayed to be superimposed with each other and that the degree of influence that may occur when the service is stopped is warningly displayed after the collapse of the redundant configuration and until the restoration of the redundant configuration. A technique of graphically displaying the states of the redundant configuration to be superimposed thereon is the same as that described with reference to FIG. 15. In addition, the solid line shown as the 'record' representing the actual access frequency and the dashed line shown as the 'service state' representing the states of the redundant configuration of the server are shown only up to the present time (around 11:30).

The graph shown in FIG. 16 distinctly shows, as the degree of influence that may occur when the service is stopped, the area interposed between the line indicating the predicted access frequency after the collapse of the redundant configuration and after the present time and a horizontal axis indicating the access frequency 'zero'. In addition, a unit for distinctly displaying the area may be realized according to the unit for distinctly displaying the influence degree area described in the second embodiment.

According to the graph shown in FIG. 16, it is seen that the time around 10:30 is the error occurrence time (influence start time) and that the redundant configuration has not been yet restored at the present time. After this, it is possible to ascertain, by a size of an area A that is distinctly displayed, the degree of influence that may occur when an error occurs in a preliminary server and thus the service is stopped.

The application is based on Japanese Patent Application No. 2010-235302 filed on Oct. 20, 2010, the content of which is incorporated herein by reference.

What is claimed is:

1. A service management device comprising:
  a graphing unit that graphically displays, on an identical time series graph, an access frequency to a predetermined service provided on a computer network and a predicted access frequency to the service in a state where no error occurs in the service, and displays an error occurrence time, on the time series graph, when the error occurs in the service; and
  an influence determination unit that determines an influence termination time as a time when the error no longer has an influence on the service provision, based on a relationship between the access frequency and the predicted access frequency on the time series graph, and causes the graphing unit to display the influence termination time.

2. The service management device according to claim 1, wherein the graphing unit displays, on the time series graph, the influence termination time determined by the influence determination unit.

3. The service management device according to claim 2, wherein the graphing unit graphically displays the access frequency and the predicted access frequency on a time series line graph, and distinctly displays, as information indicating the degree of influence on the service provision due to the error, an area interposed between a line indicating the access frequency and a line indicating the predicted access frequency after the error occurs.

4. The service management device according to claim 2, wherein the graphing unit graphically displays the access frequency and the predicted access frequency on the time series line graph, and distinctly displays, as information indicating the degree of influence on the service provision due to the error, an area interposed between a line indicating the access frequency and a line indicating the predicted access frequency after the error occurs and before the influence termination time.

5. The service management device according to claim 2, further comprising:
  an access information acquisition unit that acquires access information in which information indicating an access time is associated with an access frequency to a predetermined service; and
  an error occurrence time acquisition unit that acquires information indicating an error occurrence time if an error occurs in the service,
  wherein the graphing unit graphically displays, on the time series graph, the access frequency to the service using the access information and displays the error occurrence time using the information indicating the error occurrence time.

6. The service management device according to claim 2, wherein the predicted access frequency is determined based on a past access record to the service.

7. The service management device according to claim 1, wherein the graphing unit graphically displays the access frequency and the predicted access frequency on a time series line graph, and distinctly displays, as information indicating the degree of influence on the service provision due to the error, an area interposed between a line indicating the access frequency and a line indicating the predicted access frequency after the error occurs.

8. The service management device according to claim 7, further comprising:
  an access information acquisition unit that acquires access information in which information indicating an access time is associated with an access frequency to a predetermined service; and
  an error occurrence time acquisition unit that acquires information indicating an error occurrence time if an error occurs in the service,
  wherein the graphing unit graphically displays, on the time series graph, the access frequency to the service using the access information and displays the error occurrence time using the information indicating the error occurrence time.

9. The service management device according to claim 1, wherein the graphing unit graphically displays the access frequency and the predicted access frequency on the time series line graph, and distinctly displays, as information indicating the degree of influence on the service provision due to the error, an area interposed between a line indicating the access frequency and a line indicating the predicted access frequency after the error occurs and before the influence termination time.

10. The service management device according to claim 9, further comprising:
  an access information acquisition unit that acquires access information in which information indicating an access time is associated with an access frequency to a predetermined service; and
  an error occurrence time acquisition unit that acquires information indicating an error occurrence time if an error occurs in the service,
  wherein the graphing unit graphically displays, on the time series graph, the access frequency to the service using the access information and displays the error occurrence time using the information indicating the error occurrence time.

11. The service management device according to claim 1, further comprising:
  an access information acquisition unit that acquires access information in which information indicating an access time is associated with an access frequency to a predetermined service; and
  an error occurrence time acquisition unit that acquires information indicating an error occurrence time if an error occurs in the service,
  wherein the graphing unit graphically displays, on the time series graph, the access frequency to the service using the access information and displays the error occurrence time using the information indicating the error occurrence time.

12. The service management device according to claim 1, wherein the predicted access frequency is determined based on a past access record to the service.

13. The service management device according to claim 1, wherein the graphing unit displays, on the time series graph, time when the service is restored from the error.

14. The service management device according to claim 1, wherein the errors in the service include at least one from among an error in which the service is not normally operated, an error in which a redundant configuration of a server providing the service having a redundant configuration collapses, and an error in which a response time of the server is later than a predetermined time.

15. A display method comprising:
graphically displaying, on an identical time series graph, an access frequency to a predetermined service provided on a computer network and a predicted access frequency to the service in a state where no error occurs in the service;
determining, via an influence determination unit, an influence termination time which is time when the error no longer has an influence on the service provision, based on a relationship between the access frequency and the predicted access frequency on the time series graph;
displaying an error occurrence time on the time series graph, when the error occurs in the service; and
graphically displaying the determined influence termination time.

16. A non-transitory information storage medium storing a program for causing a computer to function as a graphing unit and an influence determination unit,
wherein the graphing unit graphically displays, on an identical time series graph, an access frequency to a predetermined service provided on a computer network and a predicted access frequency to the service in a state where no error occurs in the service, and displays an error occurrence time, on the time series graph, when the error occurs in the service, and
wherein the influence determination unit determines an influence termination time as a time when the error no longer has an influence on the service provision, based on a relationship between the access frequency and the predicted access frequency on the time series graph, and causes the graphing unit to display the influence termination time.

* * * * *